United States Patent [19]
Kleine et al.

[11] 4,235,287
[45] Nov. 25, 1980

[54] HEAT EXCHANGE PANEL

[75] Inventors: Charles A. Kleine, Florissant, Mo.; Verne L. Middleton, East Alton, Ill.

[73] Assignee: Olin Corporation, New Haven, Conn.

[21] Appl. No.: 573,953

[22] Filed: May 2, 1975

[51] Int. Cl.³ .............................. F28F 3/14; F24J 3/02
[52] U.S. Cl. .................................... 165/170; 126/445; 165/174
[58] Field of Search .................... 29/157.3 V; 62/523; 165/170, 174; 126/271; 237/1 A

[56] References Cited

U.S. PATENT DOCUMENTS

| Re. 25,619 | 7/1964 | Adams | 165/170 X |
|---|---|---|---|
| 1,994,903 | 3/1935 | Warrender | 29/157.3 V |
| 2,626,130 | 1/1953 | Raskin | 62/523 |
| 2,934,322 | 4/1960 | Hazard | 165/170 |
| 2,957,679 | 10/1960 | Campbell | 165/170 |
| 3,004,327 | 10/1961 | Keith et al. | 29/157.3 V |
| 3,222,763 | 12/1965 | Heuer | 29/157.3 V |
| 3,839,975 | 10/1974 | Tranel | 29/157.3 V |

FOREIGN PATENT DOCUMENTS

| 329140 | 2/1919 | Fed. Rep. of Germany | 165/170 |
|---|---|---|---|
| 1075645 | 2/1960 | Fed. Rep. of Germany | 62/523 |
| 1097233 | 7/1955 | France | 165/170 |
| 485095 | 9/1953 | Italy | 165/170 |

Primary Examiner—Sheldon Richter
Attorney, Agent, or Firm—Paul Weinstein

[57] ABSTRACT

A heat exchange panel having a desired system of internal tubular passageways is described, wherein the internal passageways include opposed headers connected by connecting portions of said passageways extending therebetween. The headers are designed to provide uniform fluid distribution and to enable efficient drainage of fluid from the unit, including any entrapped gases.

8 Claims, 10 Drawing Figures

HEAT EXCHANGE PANEL

BACKGROUND OF THE INVENTION

This invention relates to metal panels having a desired system of internal tubular passageways for a heat exchange medium, wherein the internal tubular passageways are disposed between spaced apart portions of the thickness of the panel. The panels of the present invention find particular application in devices for utilizing solar energy and, particularly, to solar energy adsorbing devices for elevating fluid temperature.

It is well known that the radiation of the sun can be collected as a source of energy for heating or cooling or for direct conversion to electricity. Heating and cooling depend upon collection of rays of solar energy in a fluid heat transfer system. The heated fluid is pumped or allowed to flow to a place of utilization for the thermal energy it has acquired.

In certain areas of the world, solar energy is the most abundant form of available energy if it could be harnessed economically. Even in more developed areas of the world, the economic harnessing of solar energy would provide an attractive alternative to the use of fossil fuels for energy generation.

It is a particular object of the present invention to provide a metal panel for use in a solar energy collector system which enables the efficient and economical use of solar energy.

It is a particular object of the present invention to provide a metal panel as aforesaid which is efficiently designed to allow maximum utilization of internal passageway systems in a solar energy collector.

Further objects and advantages ofthe present invention will appear hereinafter.

SUMMARY OF THE INVENTION

In accordance with the present invention a highly efficient heat exchanger is provided which is particularly suited for use as a solar collector panel. In the broadest embodiment the heat exchanger of the present invention has a desired system of tubular passageways for a heat exchange medium defining opposed headers connected by connecting portions of said passageways extending therebetween, said passageways having entry and exit portions extending from said headers to provide ingress and egress openings for said heat exchange medium, wherein said headers define an angle of at least 91° with respect to the direction of flow of said heat exchange medium in said heat exchanger, normally with respect to the entry and exit portions extending from said headers. In the preferred embodiment, the metal panel or plate of the present invention has a desired system of internal tubular passageways for a heat exchange medium, wherein said passageways are disposed between spaced apart portions of the thickness of the panel and define opposed headers connected by connecting portions of said passageways extending therebetween. The connecting portions of said passageways extend in said panel in a direction transverse to and interconnecting said headers. Generally the connecting portions extend longitudinally in said panel, although naturally the connecting passageways may extend transversely if desired. The internal passageways are provided with entry and exit portions extending from the headers to opposed edges of the panel in order to provide ingress and egress openings for the heat exchange medium. The headers define an angle of at least 91°, and generally from 92° to 100° with respect to the direction of flow of said heat exchange medium and normally with respect to the entry and exit portions, respectively, extending therefrom. In addition, preferably the headers include portions of the metal which are bonded together to provide increased header strength, improve fluid flow control and directionality and provide interruption in the flow of the heat exchange medium.

In accordance with the present invention the foregoing panel achieves significant advantages. The defined angle between the headers and the entry and exit portions, respectively, provides a generally inclined header containing bonded portions which is so designed as to provide uniform fluid distribution. In addition, the inclined header of the present invention provides a means to efficiently drain fluid from the unit and also to provide a drain for collected gases, thereby preventing air locks. In addition to the foregoing, the bonded portions in the headers provide increased header strength, improve fluid flow control and directionality and provide interruption in the flow of the heat exchange medium and materially aid in obtaining uniform fluid distribution throughout the unit.

As indicated above, the preferred embodiment utilizes a metal panel having a system of internal fluid passageways, conventionally painted black, as will be described in more detail hereinbelow; however, the concepts of the present invention may also be advantageously utilized in heat exchangers generally, such as, for example, using extrusions. Since the concepts of the present invention are particularly advantageous in metal panels having a system of internal fluid passageways, the present invention will be specifically described hereinbelow utilizing this type of system.

The present invention will be more fully described in the ensuing specification.

DETAILED DESCRIPTION

Figure 1:
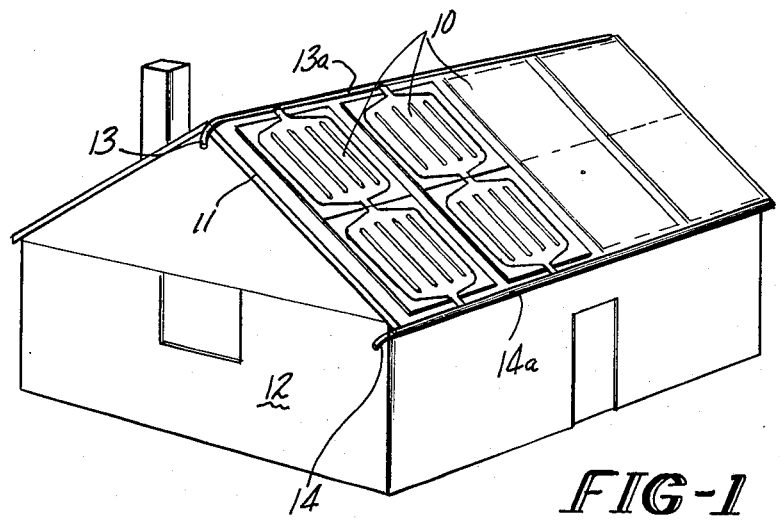
FIG. 1 is a diagram showing schematically the manner in which the panels of the present invention can be employed.

The panels of the present invention are preferably utilized in a solar heating system as shown in FIG. 1 wherein a plurality of panels of the present invention 10 are mounted on roof 11 of building 12 with conduits 13 and 14 connected in any convenient fashion to the equipment in the building, with the connections not shown. Thus, for example, cold water may go into conduit 13 from the building 12 by means of a conventional pump or the like. The water flows along common manifold 13a and is distributed into panels 10. The water flows through panels 10, is heated by means of solar energy, is collected in common manifold 14a, and flows into conduit 14. The heated water is then stored or utilized in a heat exchange system inside the building in a known manner. Naturally, if desired, the water flow may be reversed with the cold water entering via conduit 14 and collected via conduit 13. Alternatively, the solar heating unit of the present invention may be used or placed in any suitable environment, such as on the ground with suitable fasteners to prevent displacement by wind or gravity. The solar heating unit of the present invention may be used for residential heating purposes, such as in providing hot water in a residential environment. For example, three panels of the present invention having dimensions of 8 feet × 4 feet would efficiently supply an average household of four with hot water for home use. Alternatively, the solar panels of the present invention may be conveniently used for heating water for swimming pools or for preheating water for domestic gas or oil fired domestic hot water heaters. The fluid is preferably retained in a closed system with the water in the system heated in the solar unit and delivered into an insulated cistern or container so that the heated fluid may be stored up during sunshine for use on cool cloudy days or at night when the heating of the fluid in the panel will not be of sufficient degree to provide the desired heat at the point of use.

A thermostat not shown is desirably installed at the top of the solar heater and this thermostat may be set to turn on a circulating pump whenever the temperature reaches a predetermined reading. The pump will then pump the water through the system as generally outlined above.

Figures 2, 3:
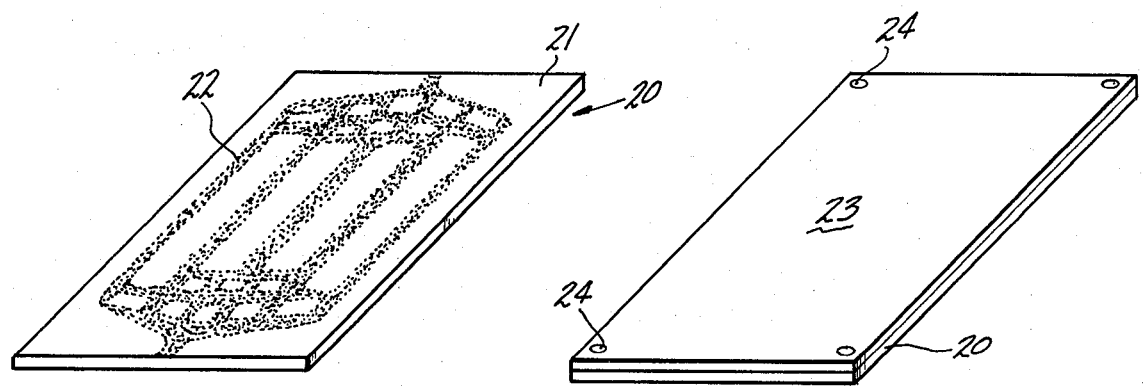
FIG. 2 is a perspective view of a sheet of metal having a pattern of weld inhibiting material applied to a surface thereof.
FIG. 3 is a perspective view of a composite metal blank wherein a second sheet of metal is superimposed on the sheet of metal shown in FIG. 2 with the pattern of weld inhibiting material sandwiched therebetween.
Figure 4:
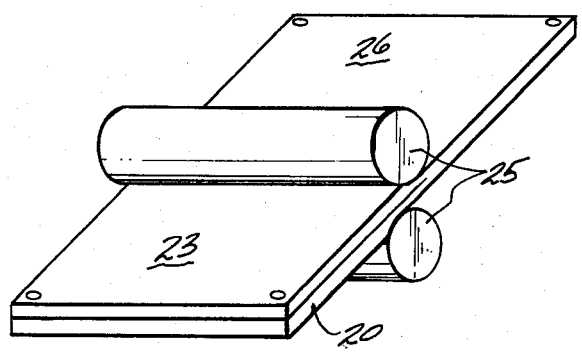
FIG. 4 is a schematic perspective view showing the sheets of FIG. 3 being welded together while passing through a pair of mill rolls.

As indicated above, the present invention contemplates a particularly preferred panel design for optimum efficiency in a solar heating system as described above. The metal panel or plate of the present invention is desirably fabricated by the ROLL-BOND process as shown in U.S. Pat. No. 2,609,002. FIG. 2 illustrates a single sheet of metal 20 as aluminum or copper or alloys thereof, having applied to a clean surface 21 thereof a pattern of weld inhibiting material 22 corresponding to the ultimate desired passageway system. FIG. 3 shows the sheet 20 having superimposed thereon a second sheet 23 with a pattern of weld inhibiting material 22 sandwiched between the units. The units 20 and 23 are tacked together as by support welds 24 to prevent relative movement between the sheets as they are subsequently welded together as shown in FIG. 4 by passing through a pair of mill rolls 25 to form welded blank 26. It is normally necessary that the sheets 20 and 23 be heated prior to passing through the mill rolls to assure that they weld to each other in keeping with techniques well known in the rolling art.

Figure 7:
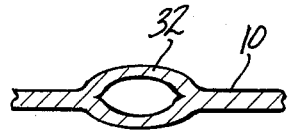
FIG. 7 is an alternate view showing a variation in the tube configuration similar to the view of FIG. 6.
Figure 6:
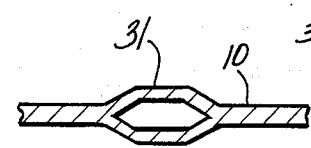
FIG. 6 is a sectional view taken along lines 6—6 of FIG. 5.
Figure 5:
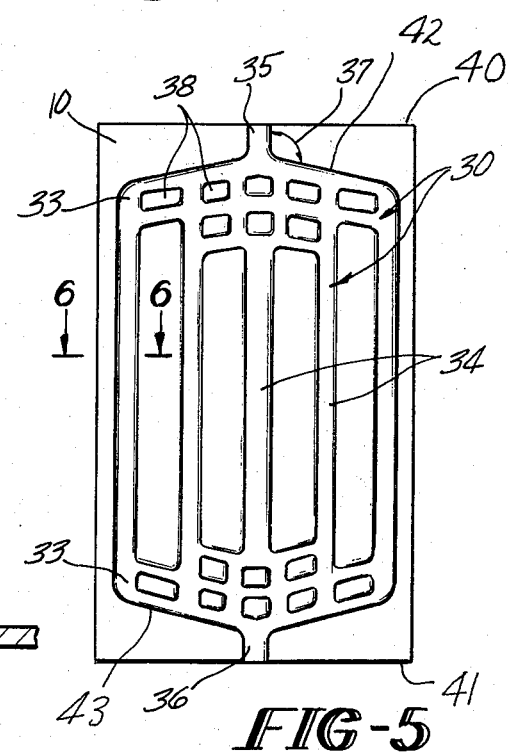
FIG. 5 is a top view showing the panel of the present invention having internal tubular passageways disposed between spaced apart portions of the thickness of the panel in the areas of the weld inhibiting material.

The resultant blank 26 is characterized by the sheets 20 and 23 being welded together except at the area of the weld inhibiting material 22. The blank 26 with the unjoined inner portion corresponding to the pattern of weld inhibiting material 22 may then be softened in any appropriate manner as by annealing, and thereafter the blank may be cold rolled to provide a more even thickness and again annealed. The portions of the panel adjacent the weld inhibiting material 22 are then inflated by the introduction of fluid distending pressure, such as with air or water, in a manner known in the art to form a system of internal tubular passageways 30 corresponding to the pattern of weld inhibiting material as shown in FIG. 5. The passageways 30 extend internally within paenl 10 and are disposed between spaced apart portions of the thickness of said panel. Thus, panel 10 comprises a hollow sheet metal panel or plate having a system of fluid passageways 30 for a heat exchange medium extending internally therein. If the passageways are inflated by the introduction of fluid distending pressure between flat die platens, the resultant passageways have a flat topped configuration 31 as shown in FIG. 6. If, on the other hand, passageways 30 are formed without the presence of superposed platens the resultant passageway configuration has a semicircular shape 32 as shown in FIG. 7.

As shown in FIG. 5, the passageways 30 include opposed headers 33 connected by connecting portions 34 of said passageways extending longitudinally in panel 10 between headers 33 and interconnecting same, with the opposed headers 33 extending in a direction transverse to said longitudinal passageways. Preferably, opposed headers 33 are connected by a plurality of spaced, parallel individual connecting portions 34 of said passageways extending between the headers.

The passageways include entry portion 35 and exit portion 36 extending from the headers 33 to opposed edges 40 and 41 of panel 10 to provide ingress and egress openings for the heat exchange medium. Headers 33 possess outer edges 42 and 43, respectively, defining the perimeter thereof adjacent the entry portion 35 and exit portion 36, respectively, extending therefrom. It is a key feature of the present invention that the headers define an external angle 37 of at least 91° with respect to the fluid flow and generally with respect to the entry and exit portions 35 and 36, respectively, extending therefrom. Generally, the angle is from 92° to 100° and preferably 92½ to 97½°. The apex of the perimeter of at least one of said outer edges defines an external angle as indicated with respect to the central axis of the connecting portions, which is or with respect to the central axis of said entry and exit portions. That is, when the panel is used as shown in FIG. 1, the headers define an angle of from 1° to 10° from the horizontal. The provision of angle 37 provides an inclined header which enables uniform fluid distribution within panel 10. Thus, one provides a means to fully drain fluid from the unit and to provide a drain for collected gases thereby preventing air locks. The ensuring of proper drainage for internal fluids overcomes several problems noted heretofore. For example, proper drainage mitigates the possibility of internal solution freezing in the unit with possible subsequent expansion and tube wall fracture. In addition, proper fluid drainage eliminates the possibility of sediment collecting in the unit which would create an environment conducive to corrosion. Naturally, an efficiently drained unit enables a more efficient system with consequent complete usage of the available solar energy.

An additional significant feature of the panels of the present invention is to provide headers 33 that include bonded portions 38 of the metal 38 which are welded together to provide increased header strength, improve fluid flow control and directionality and provide interruption in the flow of the heat exchange medium. This can be readily obtained in accordance with the present invention by simply not including weld preventive material where one desires the bonded portions 38. As shown in FIG. 5, it is preferred to provide waffle-type headers by including a plurality of bonded portions 38 in a generally symmetrical fashion on both headers 33 in order to channel the fluid flow in any predetermined manner. Naturally, non-symmetrical patterns of bonded portions 38 may be employed and a variety of desired patterns may be selected.

Figure 10:
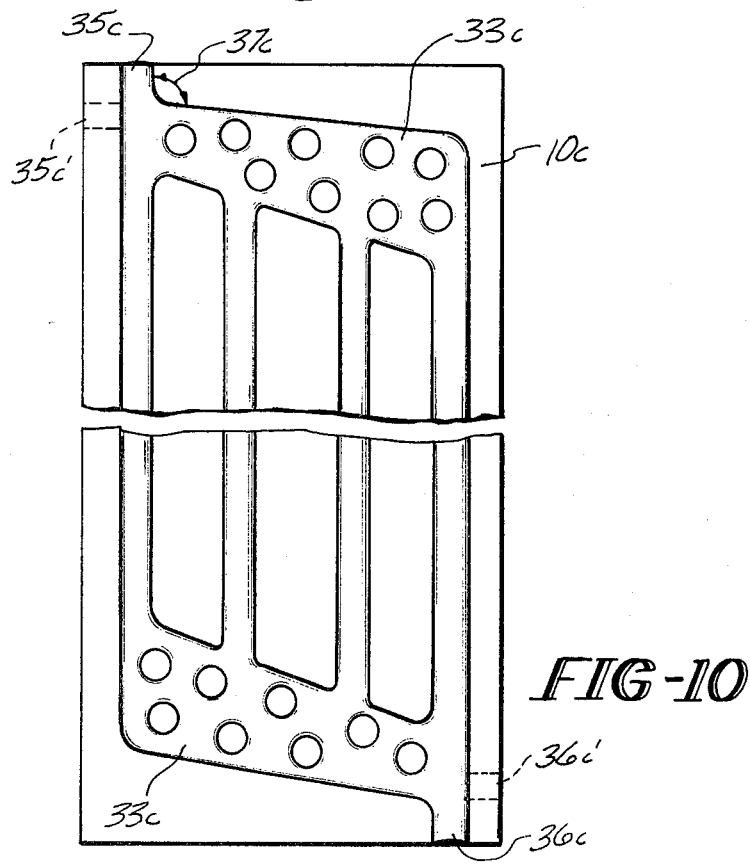

In the preferred embodiment the entry and exit portions 35 and 36 intersect each respective header at the center thereof and are in a line with each other. If desired, however, the entry and exit portions may intersect each respective header at opposite ends thereof as shown by entry and exit portions 35c and 36c in FIG. 10. Naturally, also, the entry and exit portions may if desired extend in the same direction as the header as shown in FIG. 10 in phantom as 35c' and 36c'. In this case the header angle would be based on the direction of fluid flow, or from the horizontal.

The symmetrical design of the panels of the present invention makes the panels easier to handle so that either end may be the upper portion. Similarly, it can be seen that the angled header promotes drainage in both ends of the panel.

Figure 8:
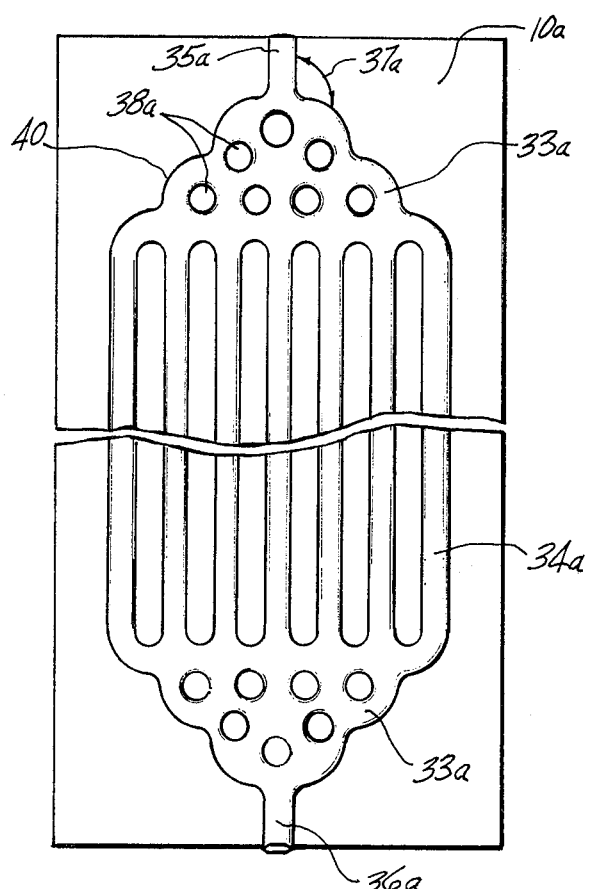
FIGS. 8, 9 and 10 are top views showing variations in the panel design of the present invention.
Figure 9:
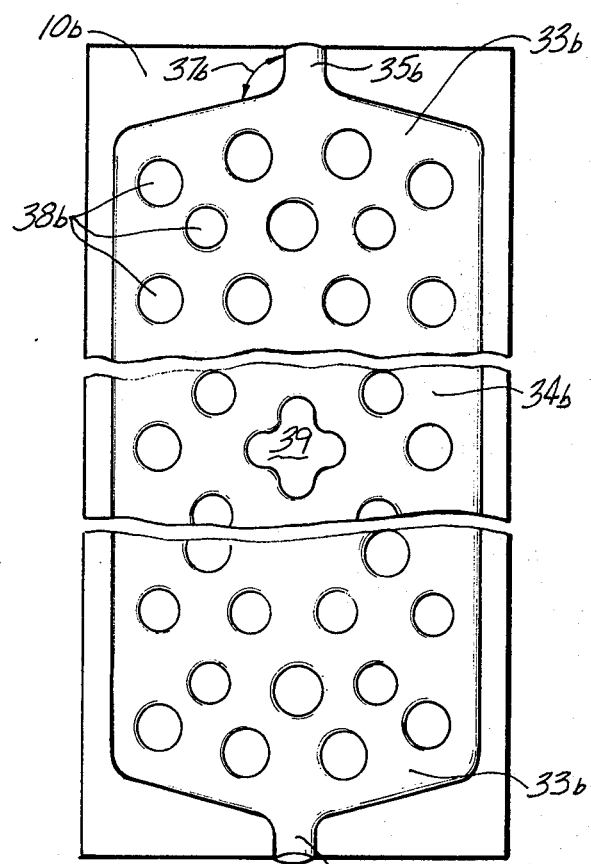

FIGS. 8, 9 and 10 show variations in the panel design of the present invention. FIG. 8 shows a panel 10a wherein the portions of headers 33a defining an angle "a with respect to entry and exit portions 35a and 36a, respectively, are scalloped as shown at 40. This header configuration enables efficient channeling of fluid flow configuration enables efficient channeling of fluid flow throughout the system. As shown in FIG. 8, opposed headers 33a are connected by a plurality of individual spaced, parallel connecting portions 34a of said passageways extending between the headers. A plurality of bonded portions 38a are included in headers 33a. FIG. 9 shows an alternative embodiment wherein panel 10b includes a plurality of bonded portions 38b throughout the panel as well as in headers 33b. This enables efficient break up of the fluid flow throughout the panel, as well as increased panel strength and flow control and directionality throughout the panel. Panel 10b includes entry and exit portions 35b and 36b, respectively, defining an angle 37b with respect to headers 33b. Connecting portions 34b of the passageways extend between headers 33b. Central bonded portion 39 may be used as a placement guide in the inflation operation.

As shown in FIG. 10, entry and exit portions 35c and 36c intersect each respective header 33c at opposite ends thereof and define angle 37c at opposite ends thereof.

Naturally, several alternative designs may be envisioned by one skilled in the art in accordance with the concepts described above.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A metal panel having a desired system of internal tubular passageways for a heat exchange medium disposed between spaced apart portions of the thickness of said panel, said passageways defining opposed headers connected by connecting portions of said passageways extending therebetween, wherein said heat exchange medium flows from header to header through said connecting portions, said headers having entry and exit portions extending therefrom to opposed edges of said panel to provide ingress and egress openings for said heat exchange medium, said entry and exit portions intersecting each respective header at the center thereof, said entry and exit portions having a central axis, wherein said headers include a plurality of portions of said metal which are bonded together to provide interruption in the flow of said heat exchange medium and wherein said headers possess outer edges defining the perimeter thereof adjacent the entry or exit portions, respectively, extending therefrom, and wherein the apex of the perimeter of at least one of said outer edges defines an external angle of at least 91° and less than 100° with respect to the central axis of said entry and exit portions, respectively, to provide uniform fluid distribution and enable efficient drainage of fluid from the heat exchanger, wherein a plurality of said panels are connected by a common manifold communicating with the entry portions of each of said panels for distributing said heat exchange medium into said panels and a common collection manifold communicating with the exit portions of each of said panels for collection of said heat exchange medium from each of said panels.

2. A panel according to claim 1 wherein said passageways include spaced, parallel individual connecting portions of said passageways extending longitudinally in said panel in a direction transverse to and interconnecting said headers.

3. A panel according to claim 1 wherein said longitudinal passageways include a plurality of portions of said metal which are bonded together to provide interruption in the flow of said heat exchange medium.

4. A panel according to claim 1 wherein said outer edges are scalloped.

5. A panel according to claim 1 utilized in a solar heating system.

6. A panel according to claim 1 wherein said opposed headers are connected by a plurality of spaced, parallel individual connecting portions of said passageways extending therebetween.

7. A panel according to claim 1 wherein said headers define an angle of from 92° to 100° with respect to the central axis of the connecting portions.

8. A panel according to claim 7 wherein said angle is from 92½ to 97½°.

* * * * *